Nov. 22, 1966 H. O. LOPER ETAL 3,286,539
PULLEY CONSTRUCTION EMPLOYING BEADED HUB
AND MEANS FOR PRODUCING SAME
Filed Sept. 16, 1964 2 Sheets-Sheet 1
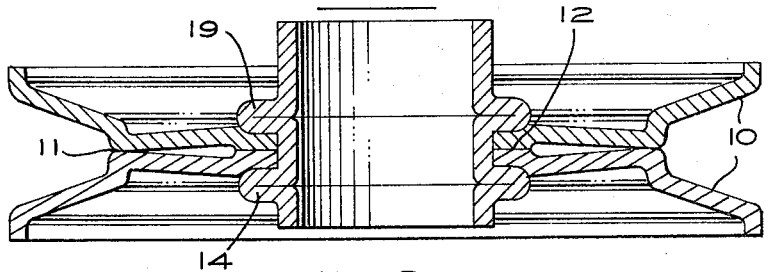
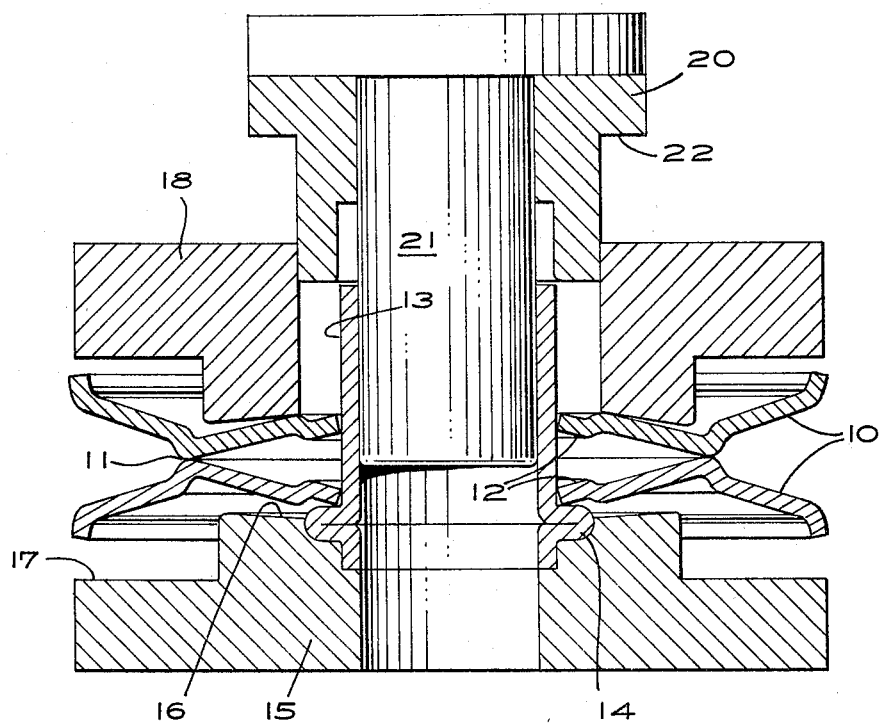
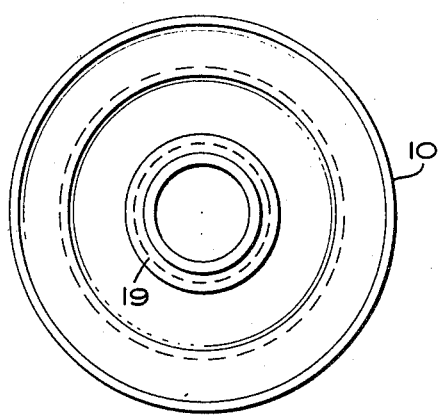
INVENTORS
HARRY O. LOPER
GEORGE T. TIMOFF
HENRY J. ANDERSON
EDWARD F. SCHLEE, JR
BY *Farley, Forster & Farley*
ATTORNEYS

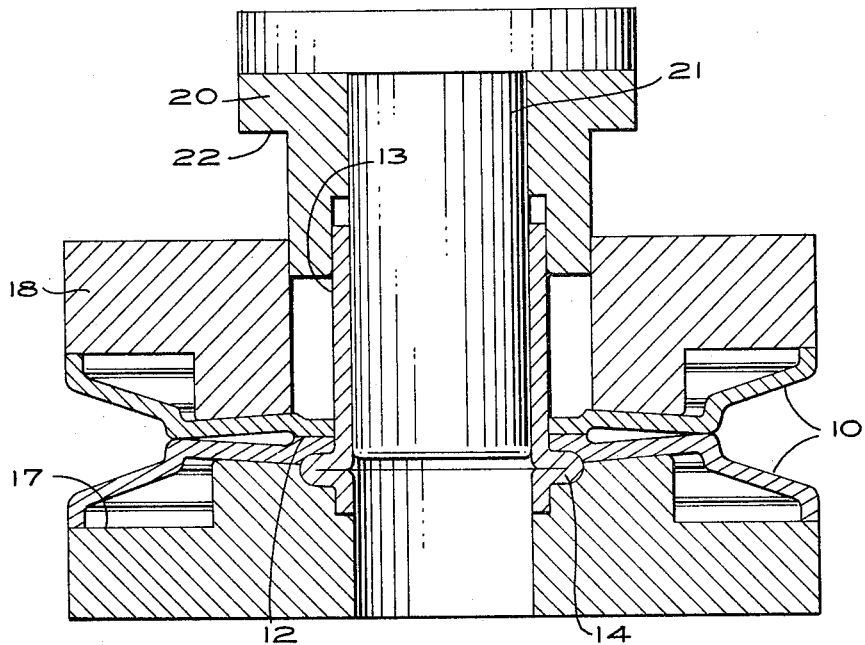
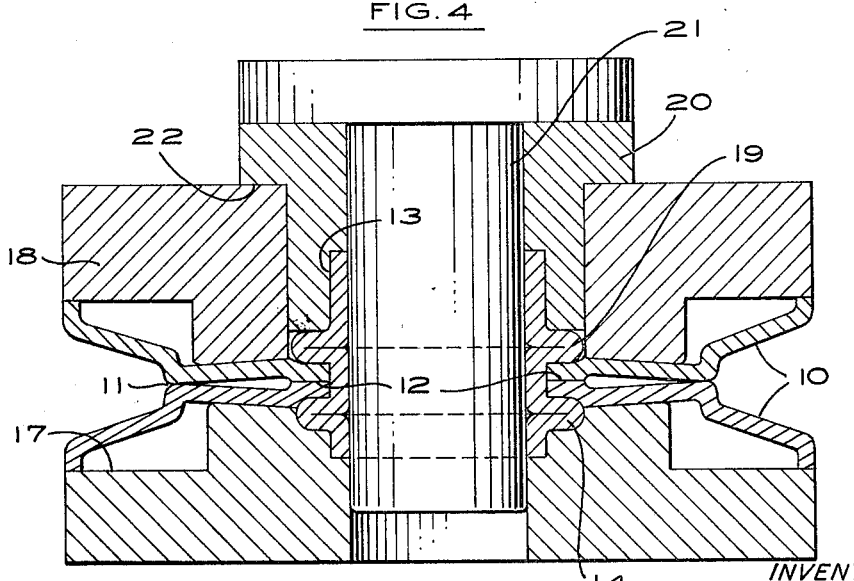
INVENTORS
HARRY O. LOPER
GEORGE T. TIMOFF
HENRY J. ANDERSON
EDWARD F. SCHLEE, JR.
BY
*Farley Forster Farley*
ATTORNEYS 3,286,539
PULLEY CONSTRUCTION EMPLOYING BEADED HUB AND MEANS FOR PRODUCING SAME
Harry O. Loper, Ypsilanti, George T. Timoff, Pontiac, and Henry J. Anderson and Edward F. Schlee, Jr., Birmingham, Mich., assignors, by mesne assignments, to The Eynon Company, Detroit, Mich., a corporation of Michigan
Filed Sept. 16, 1964, Ser. No. 396,959
2 Claims. (Cl. 74—230.4)

This invention relates to a pulley construction employing a tubular hub member having beads formed to grip and retain assembled pulley halves and more particularly spring-loaded pulley halves, and to the method and tooling for producing same.

In co-pending application, Serial No. 346,918 filed February 24, 1964, a pulley construction is disclosed wherein identical or similar pulley halves are formed as dished stampings which, in free state, prior to assembly, contact at the base of the pulley V with substantial spacing at the hub to provide a preloaded compression of the pulley halves resistant to separation from belt loads when hub members force the dished portions together in assembled relation thereby avoiding the need for welding, brazing or riveting of the pulley halves. The hubs shown in such prior application were tubular screw machine parts including shoulders and threaded nut elements for pressing the hub engaging portions of the pulley halves together.

The present construction greatly simplifies the hub components by providing a simple uniform walled tubular hub element with beads formed through axial compression, securely compressing the hub engaging portion of the pulley halves together, as well as providing a rotary drive connection therebetween, thereby completely dispensing with any nut element, any thread or shoulder forming of the tubular hub element and substantially conserving on excess material wall thickness incident to shoulder and threaded hub constructions.

These and other objects of the present invention will be better understood from the following detailed description of a specific preferred embodiment and the tooling and method employed in constructing same as illustrated in the drawings wherein:

FIG. 1 is a sectional elevation of the completed pulley assembly;

FIG. 2 is a sectional elevation of the pulley elements showing the tooling employed for bead forming at the initial stage of assembly;

FIG. 3 is a view similar to FIG. 2 showing the pulley halves compressed together preliminary to bead forming;

FIG. 4 is a view similar to FIG. 3 showing the tooling components at the end of the bead forming operation; and FIG. 5 is a reduced side elevation of the completed pulley assembly shown in FIG. 1.

With reference to FIG. 2 identical pulley halves 10 formed as dished stampings in their free state contact at the root 11 of the pulley V with a substantial space between the inwardly extending hub engaging portions 12, the inner diameter of which is dimensioned for sliding contact with a tubular hub element 13 preformed with a single bead shoulder portion 14 by conventional means prior to assembly. A stepped annular die 15 is recessed to receive the beaded end 14 of the tubular hub and is provided with a slightly dished surface 16 and an outer rim surface 17 for engaging corresponding portions of the lower pulley half when compression is applied to a similar upper die element 18, as shown in FIG. 3, prior to forming the second bead element 19 by the downward thrust of pulley bead forming ring 20 and pilot plunger 21 as shown in FIG. 4.

The pressure applied to the upper die element 18 preliminary to bead forming as shown in FIG. 3 is limited to a value sufficient to spring the dished pulley halves together into firm engagement at the inner most hub engaging portions 12 without overforming or distorting either of the pulley halves at the other portions contacted and supported by the die elements, such limited pressure being effected during the initial closing of a forming press by preliminary toggle action, resilient spring or other well-known means not shown. The secondary portion of the stroke solidly drives the pilot guide 21 and bead forming ring 20 from the position shown in FIG. 3 to the fully closed position shown in FIG. 4 during which the upper bead 19 is formed outwardly and compressed solidly against the adjacent hub engaging portions of the pulley halves with the lower bead 14 reacting against the lower die 15 so that the bead 14 of the hub is actually employed as part of the lower die in the formation of the upper bead, thereby assuring a positive press fit engagement of the pulley halves between the respective beads.

In the final closed position the shouldered engagement 22 between the bead forming ring 20 and upper die 18 provides a final sizing compression forming of the respective pulley halves relative to the fully formed beaded hub which, as will be seen from FIG. 4, is positively formed in accurate, axially true and square relationship with the centerline of the pulley halves. The final compressive squeeze pressure against the ends of the tubular hub has in practice been employed to also provide a final sizing radial compression of the tube against the pilot plunger 21 which burnishes the internal surface of the hub upon withdrawal to a highly accurate and precision cylindrical bearing surface. It has been found in practice that the grip developed on the pulley halves between the beads resulting from this method of forming is so great as to render the assembled pulley construction the equivalent of an integral construction for all practical purposes, no splines or any additional drive means of any kind being required.

It will be seen that this construction of simple accurately formed parts results in a perfectly uniform pulley having no possibility of misalignment, imbalance or out-of-true relationship while employing the utmost economy of materials and manufacturing procedures.

While a particular preferred embodiment has been shown and described above in detail it will be understood that numerous modifications might be resorted to without departing from the scope of the invention as defined in the following claims.

We claim:

1. A pulley construction comprising a pair of opposed apertured dished pulley halves assembled on a tubular hub element, said pulley halves having hub engaging portions with free state axially spaced dimensions adapted to be pressed together in pre-loaded assembled condition, said hub having a uniform wall thickness and a pair of integral annular beads adapted to hold said hub engaging portions of said dished pulley halves together in assembled relation.

2. A pulley construction comprising a pair of opposed dished sheet metal pulley halves having circumferential portions providing complementary V-belt pulley faces, base portions of said faces engaging in a free state condition while apertured hub portions are in axially spaced relation, said base portions being pre-loaded by assembly of said axially spaced apertured hub portions together in abutting relation, and a metal tubular hub having a uniform wall thickness and a pair of integral annular beads to hold said apertured hub portions together in asssembled relation.

(References on following page)

References Cited by the Examiner

UNITED STATES PATENTS

| | | | |
|---|---|---|---|
| 1,742,484 | 1/1930 | Nelson | 29—159 |
| 2,646,689 | 7/1953 | Maher | 74—230.8 |
| 2,781,669 | 2/1957 | Whitesell | 74—230.3 |
| 2,823,820 | 2/1958 | Merchant | 29—208 |
| 2,869,223 | 1/1959 | Killian et al. | 29—159 |
| 2,919,592 | 1/1960 | Kramen et al. | 74—230.8 |
| 2,986,192 | 5/1961 | Macleod | 29—208 |
| 3,190,134 | 6/1965 | Sadler et al. | 74—230.4 |

DAVID J. WILLIAMOWSKY, *Primary Examiner.*

DON A. WAITE, *Examiner.*

J. A. WONG, *Assistant Examiner.*